C. VAN HORN.
Slide Rest.
No. 12,747.
Patented April 17, 1855.
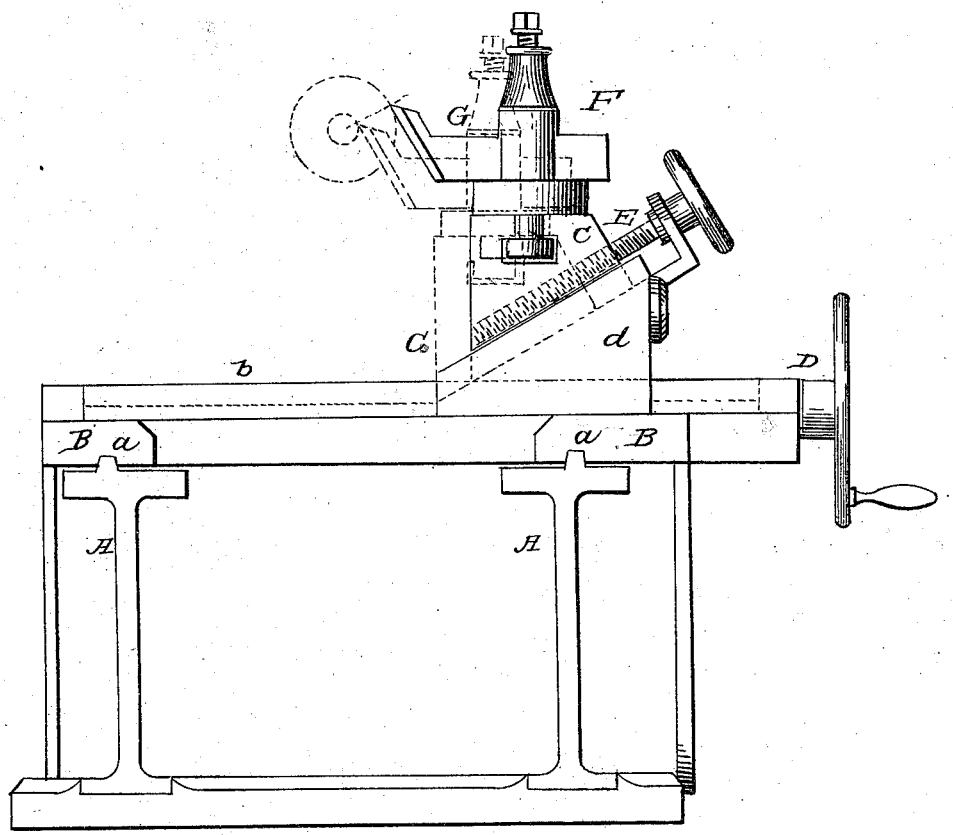

UNITED STATES PATENT OFFICE.

CHESTER VAN HORN, OF SPRINGFIELD, MASSACHUSETTS.

SLIDE-REST FOR LATHES.

Specification of Letters Patent No. 12,747, dated April 17, 1855.

*To all whom it may concern:*

Be it known that I, CHESTER VAN HORN, of Springfield, in the county of Hampden and State of Massachusetts, have invented new and useful Improvement in Slide-Rests for Lathes; and I do hereby declare that the following is a full, clear, and exact description of the same, reference being had to the annexed drawing, making a part of this specification, said drawing being a side view of my improvement.

The nature of my invention consists in forming the tool block of two parts, and connecting said parts together by a dovetail or in any proper manner so that the upper part may slide upon the lower part, the faces of the two parts that are in contact and connected being in an oblique position and thereby causing as the upper part is moved backward and forward, the tool to be elevated or depressed as will be hereafter fully shown and described.

To enable others skilled in the art to fully understand and construct my invention I will proceed to describe it.

A represents the bed of a lathe constructed in the usual manner, and B is the carriage of a slide rest also of usual construction and working on ways or guides (*a*) on the bed in the ordinary manner, the carriage being moved longitudinally on the bed by the usual screw. The carriage B, is provided with transverse ways or guides (*b*) on which the tool block C works. The tool block C is moved back and forth on the ways or guides (*b*) by a screw D, which works through a nut on the under side of the tool block.

The tool block C is formed of two parts (*c*) (*d*) or the tool block may be described as being divided by an oblique cut into two parts and the oblique faces are connected by a dove tail or in any other proper manner so that the upper part (*c*) may slide or work upon the lower part (*d*). The upper part (*c*) may be operated by a screw E as shown in the drawing or in any other proper manner.

F is the tool stock in which the tool G is secured. The tool stock is secured to the upper surface of the part (*c*) of the tool block and is of the usual construction and form.

The object of the invention will be readily seen, by operating the screw E or an equivalent device, the part (*c*) of the tool block may be moved forward and downward or backward and upward, and the tool G will of course be raised or lowered accordingly so as to act properly upon the article in the lathe, two positions of the tool are shown in the drawing, one in red. The other motions of the tool, are given in the usual manner as before described, viz, the tool block being moved bodily forward by the screw D, and the carriage B being moved longitudinally on the bed by a screw in the ordinary manner.

By the above improvement the tool is raised and lowered with the greatest facility and in an extremely simple manner. There is no liability of any of the parts getting out of repair.

I do not claim the carriage B nor any mode of operating the same, neither do I claim the transverse movement of the tool block C on the carriage B, for these are common to most slide rests, but What I do claim as new and desire to secure by Letters Patent, is—

Forming the tool block C of two parts (*c*) (*d*) and connecting said parts together by a dovetail or its equivalent so that the upper part (*c*) may slide or work on the lower part (*d*), the faces of the two parts (*c*) (*d*), that are connected being oblique or inclined as herein shown, and the part (*c*) being moved or operated by a screw E or its equivalent for the purpose of elevating or depressing the tool G as herein described.

CHESTER VAN HORN.

Witnesses:
R. A. CHAPMAN,
F. CHAMBERLAIN.